(12) United States Patent
Beaudoin et al.

(10) Patent No.: US 11,536,276 B2
(45) Date of Patent: Dec. 27, 2022

(54) VOLUMETRIC REAL TIME FLOW ENGINE

(71) Applicant: TECHNOLOGIES MAID LABS INC., Granby (CA)

(72) Inventors: Benoit Beaudoin, Granby (CA); Samuel Gervais, Sherbrooke (CA); Maxime Avoine, Granby (CA)

(73) Assignee: TECHNOLOGIES MAID LABS INC.

( * ) Notice: Subject to any disclaimer, the term of this patent is extended or adjusted under 35 U.S.C. 154(b) by 656 days.

(21) Appl. No.: 16/490,165

(22) PCT Filed: Mar. 5, 2018

(86) PCT No.: PCT/CA2018/050254
§ 371 (c)(1),
(2) Date: Aug. 30, 2019

(87) PCT Pub. No.: WO2018/157261
PCT Pub. Date: Sep. 7, 2018

(65) Prior Publication Data
US 2020/0003218 A1 Jan. 2, 2020

Related U.S. Application Data

(60) Provisional application No. 62/466,419, filed on Mar. 3, 2017.

(51) Int. Cl.
*F04D 15/02* (2006.01)
*F04D 13/12* (2006.01)
(Continued)

(52) U.S. Cl.
CPC ......... *F04D 15/0218* (2013.01); *F04D 13/12* (2013.01); *F04D 15/0245* (2013.01);
(Continued)

(58) Field of Classification Search
CPC .................................................. F04D 15/0245
See application file for complete search history.

(56) References Cited

U.S. PATENT DOCUMENTS

| 4,455,870 A | 6/1984 | Jorritsma |
| 5,190,442 A * | 3/1993 | Jorritsma ............ F04D 15/0083 |
| | | 417/19 |

(Continued)

OTHER PUBLICATIONS

European Search Report, Application No. 18760486.3, dated Nov. 26, 2020.

*Primary Examiner* — Paul M. West
*Assistant Examiner* — Mark A Shabman
(74) *Attorney, Agent, or Firm* — Lavery, De Billy, LLP; Gonzalo Lavin

(57) ABSTRACT

Method and system for determining the real-time flow into a wastewater pump station using analog level sensing technologies. An Accurate Level Generator mechanism supplies an accurate mean value out of multiple readings for each level used to calculate the volume between levels. Two consecutive levels are used to calculate the volume between them using an Accurate Flow Calculator and the time it took to get from one level to the other. A Real Time Inflow Calculator adds results regarding the pumps in operation and overflow events, which are ways for the water to exit the pumping station. At a water level approaching where the pumps start or stop, or when abnormal events occur, a Predictive Abnormal Event Adjuster replaces the highly probable abnormal Real Time Inflow Result by a more stable and possible value, which is the last one calculated plus its variation over time.

7 Claims, 7 Drawing Sheets

Accurate Level Generator

(51) Int. Cl.
*G01D 1/02* (2006.01)
*G01F 1/00* (2022.01)
*G01F 23/00* (2022.01)

(52) U.S. Cl.
CPC ............... *G01D 1/02* (2013.01); *G01F 1/00* (2013.01); *G01F 23/0007* (2013.01)

(56) References Cited

U.S. PATENT DOCUMENTS

| | | | |
|---|---|---|---|
| 5,313,842 A | 5/1994 | Marsh et al. | |
| 5,831,174 A | 11/1998 | Beaudoin | |
| 2009/0202359 A1* | 8/2009 | Duncan | G01F 1/007 417/43 |
| 2010/0135823 A1* | 6/2010 | Andy | E03F 5/22 417/12 |
| 2013/0256225 A1* | 10/2013 | Leland | C02F 3/1284 210/96.1 |

* cited by examiner

Wastewater Pump Station

Summary

Accurate Level Generator

Predictive Abnormal Event Adjustor

Conditional Repeater

Alternating Pumps (Even Starts)

Alternating Pumps (Day and Night)

Alternating Pumps (Based on Flow Rate)

Alternating Pumps (Based on Efficiency)

Pump Selection Mechanism

VOLUMETRIC REAL TIME FLOW ENGINE

CROSS-REFERENCE TO RELATED APPLICATIONS

This application is a National Entry Application of PCT application no PCT/CA2018/050254 filed on Mar. 5, 2018 and published in English under PCT Article 21(2), which itself claims benefit of U.S. provisional application Ser. No. 62/466,419, filed on Mar. 3, 2017. All documents above are incorporated herein in their entirety by reference.

FIELD OF THE INVENTION

The present invention relates to real time flow meters used for example in wastewater pump stations, as well as to pump management systems.

BACKGROUND

A wastewater pump station has a well in which sewage water enters from a pipe and is pumped out through one or more pumps. In pump stations equipped with constant speed pumps, analog and digital level sensing technologies are used to start and stop the pumps at predetermined levels, resulting in filling cycles and pumping cycles. Ideally, the distance between these water levels is maximized in order to minimize the wear of the pumps caused by pump startup stress. Volumetric flow meters use these predetermined levels and the volume of water between them to generate the average flow rate during the time it takes to go from one level to the next. This means the flow rate can only be calculated when known levels are reached, which can take seconds to hours. Therefore, the value generated by the volumetric flow meter is always an average of old data.

Pump station flow meters, or the like, are well known in the patented prior art, such as the U.S. Pat. No. 4,127,030 by Martin, U.S. Pat. Nos. 4,455,870, 4,669,308 and 4,821,580 by Jorristma, U.S. Pat. No. 4,467,657 by Olson, U.S. Pat. No. 4,897,797 by Free et al., U.S. Pat. No. 4,856,343 by Hon, U.S. Pat. No. 4,962,666 by Adney, U.S. Pat. Nos. 5,313,842 and 5,385,056 by Marsh et al., U.S. Pat. Nos. 5,597,960, 5,831,174, 6,990,431 and 2004/0260514 by Beaudoin, U.S. Pat. No. 8,740,574 and 2011/0076163 by Saukko, and U.S. Pat. Nos. 8,956,125, 9,464,925, and 2009/0202359 by Duncan et al. All these patent documents use level measurements in some way to calculate volumes for volumetric flow meters or for workload efficiency. All of them assume the levels used in their formulas, methods, processes or apparatus represent the exact levels with no coefficient of error possible. Some of these patents analyze the resulting flow by comparing it to other flow results, but none of them do that at the beginning of the process by analyzing the raw level values used to calculate the flow results. None of them mention the accuracy of the level measurements that are used to calculate their flow rates or the error resulting from variation within these level measurements, therefore no previous invention describes an apparatus able to increase the accuracy of the level measurements substantially enough to increase the flow rate calculated by the previously mentioned inventions.

Volumetric flow technology is popular because it is simple and inexpensive to install and use, but its accuracy is highly variable because it is proportional to the distance between the levels. Pump operation is based on a signal received from a level sensing apparatus. The level sensing apparatus generates a signal when a predetermined level is assumed to be reached. In reality, the size of the waves on the surface of the water in the well highly influences this signal. The top of a wave will trigger the start of a pump before the average surface of the water reaches the predetermined start level and the bottom of a wave will trigger the stop of a pump before the average surface of the water reaches the predetermined stop level. So, the accuracy of a volumetric flow meter is determined by the following equation:

$$\text{Flow Accuracy Error} = \frac{\text{Instantaneous Level Accuracy}}{\text{Distance between levels used to calculate flow}}$$

If the waves are ½ inch and the distance between levels at which pumps start or stop being 20 inches, the flow accuracy error is 2.5% (0.5/20). If the waves are ½ inch and the distance between levels is 2 inches, the flow accuracy error is 25% (0.5/2). Reducing the distance between the levels used to calculate the flow in the station greatly increases the error of the flow calculated to a point when it becomes meaningless. In the above example, if the accuracy of the level used in the flow calculation is 0.05 inches, then the accuracy of the flow meter with 2 inches between calculation levels will be 2.5% (0.05/2). There is therefore a need in this field for a process that can reduce the error related to the level value used by the volumetric flow calculation.

Multiple types of flow technologies can generate real time flow rate in the station but only the following technologies are rugged enough to work properly for a long period in wastewater: magnetic, ultrasonic and open channels. The problems with these technologies and their multiple variations are their cost of acquisition and installation, which are very high when the physical restrictions allow their installation. This is why most of the wastewater pump stations do not have any real-time flow technology.

Averaging and statistical equations have been used to average multiple values in order to improve the output of some level sensing technologies, but it has never been used with time stamped values in order to get the most probable level generated by any level sensing technology for a specific time.

Real time flow means generating a flow value that is as close to the time at which it is used as it is technically possible to do so accurately. To get closer to a "real time" value, the distance between the levels at which the pumps operate is fragmented into multiple smaller intermediate levels so multiple volumetric flow calculations can be executed during each cycle. Doing this using multiple float switches or electrodes or even analog level sensing devices set to specific levels have their own problems.

a. If the level of the water stays for a long time between two known levels, even if they are small, then the resulting flow calculated will still be the average of old data. The solution to this problem is to use a timer instead or with preset levels. This guarantees that the values generated by the volumetric flow meter are young enough to be called real-time.

b. The accuracy of the real-time flow value is inversely proportional to the distance between the levels used to calculate the flow rate, as explained previously.

Similar problems can occur with other types of sensors like pressure based level sensors. The pressure values are affected by the fall of the sewage water and debris into the well of the station or abnormal behavior of the pumps themselves. This means the sensor's instant value might not represent the actual average surface water level, which could generate sizable errors in the results. Bouncing radio waves can generate the same kind of error for ultrasonic level sensors, so the same averaging mechanism is required to improve accuracy.

There is thus a need for a method and system for accurately calculating real-time instant volumetric inflow into a wastewater pump station.

Another common issue in the field of wastewater pump stations relates to pump management. Wastewater pump stations with constant speed pumps of different maximum flow rates use different schemes to operate the pumps. The most popular sequence of operations is to alternate the number of starts evenly between the pumps in order wear them evenly. When the flow rate of the pump in operation is lower than the flow rate of the water entering the pump station, one or more additional pumps are activated and run until the water level is reduced to a normal operating level. Running multiple pumps at once is quite inefficient, as for example running two pumps at once requires 100% more energy than one pump while only pumping 50% more water. Further, as the different pumps operate at different flow rates, even though the pumps may have the same number of starts, their run times vary significantly. This leads to the pumps wearing out at different rates.

Another less used method of pump management is based on alternating which pump is activated depending on the time of day. For example, the pumps can be programmed to switch at noon, at midnight or at a different time of day. However, by using this method, both the number of starts of each pump and the run times of each pump will vary due to their different operational flow rates. As such, this method is not efficient and once again leads to pumps wearing out at different rates.

Thus, there is a need for a method of pump management that promotes efficiency by aiming to balance both the number of starts and run times of each pump, as well as by minimizing the number of times multiple pumps must operate simultaneously.

BRIEF SUMMARY OF THE INVENTION

This invention describes a process which generates the flow coming in a wastewater pump station in real time using analog level sensing technologies, which might be already installed to operate the pumps. This invention proposes to use an Accurate Level Generator mechanism to correct this problem by supplying an accurate mean value out of multiple readings for each level used to calculate the volume between these levels. The average algorithm can use a simple average, a normal curve, a regression, descriptive, inferential or inductive analysis, a correlation, a percentile rank or other means to create an average like an average of averages or a mix of averaging formulas. Two consecutive levels are used to calculate the volume between them using the Accurate Flow Calculator and the time it took to get from one level to the other. The Real Time Inflow Calculator add results regarding the pumps in operation and overflow events, which are ways for the water to exit the pumping station. When the water level arrives near pumps start or stop, or when abnormal events occur, like the water level is falling with no pump in operation, or when results are too high or low to be physically possible, then the Predictive Abnormal Event Adjuster replaces the highly probable abnormal Real Time Inflow Result by a more stable and possible value, which is the last one calculated plus its variation over time. Then, the Real Time Inflow value is released and the process repeats itself immediately.

The invention further describes a method for selecting a pump from a plurality of pumps of varying flow rate capacities for pumping water out of a wastewater pump station, and a system for carrying out such a method. According to this method, a pump selector receives flow in data detailing the flow rate of the water entering the wastewater pump station, pump flow data detailing the flow rates of each of a plurality of pumps, and power consumption data for each pump. The pump selector calculates the efficiency for each pump by dividing each pump flow data by corresponding power consumption data. Then, a switch determines whether the flow rate of the water entering the wastewater pump station is less than the pump flow rate of the pump currently in operation. If the answer is no, then the pump selector selects, among the available pumps with flow rates higher than the flow rate of the water entering the wastewater pump station, the pump with the highest efficiency. However, if the answer is yes, the pump selector simply selects the pump with the highest efficiency.

BRIEF DESCRIPTION OF THE DRAWINGS

Some embodiments of the present invention are illustrated as an example and are not limited by the figures of the accompanying drawings, in which like references may indicate similar elements in which.

DETAILED DESCRIPTION OF THE INVENTION

Figure 1:
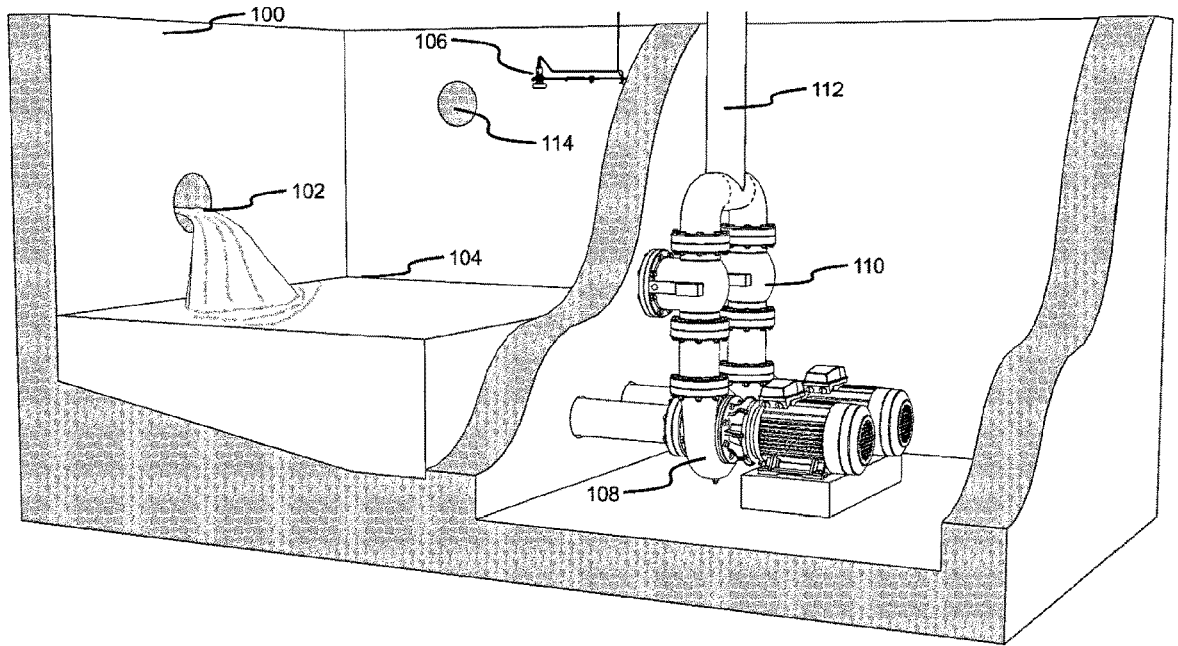
FIG. 1 is a perspective cut-out view of a known wastewater pumping station.

An embodiment of this invention may be used in wastewater pump stations. FIG. 1 presents a perspective cutout of a typical pump station. It has a well 100 in which water enters by an influent pipe 102 at an unknown flow rate. When the water level 104 reaches a predefined level detected by a level sensor 106, one or multiple pumps 108 start pumping the water out of the pumping station through check valves 110 and outlet pipe 112. Sometimes, when the flow rate at pipe 102 entering the pump station is higher than the flow rate of the pumps, the water level 104 reaches an overflow pipe 114 which evacuates the excessive water to another location.

Being a volumetric flow calculation, therefore Flow=Volume/Time, the accuracy of the resulting Flow is directly related to the accuracy of the Volume used to perform the equation and the accuracy of the Time. In an embodiment of this invention used in a wastewater pump station, the accuracy of the time could be within one second, but for another embodiment 10 seconds accuracy might be enough because events do not happen within minutes but in hours. So, the accuracy of the Time is related to the type of installation for which this invention is used.

Figure 2:
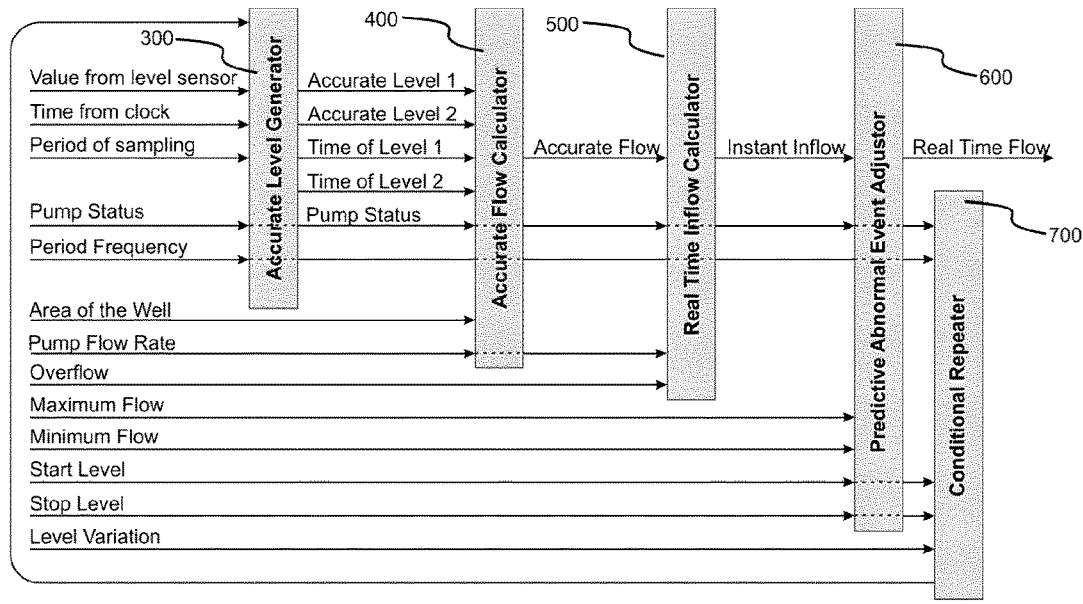
FIG. 2 is a flowchart that summarily illustrates a set of components of an illustrative embodiment of the present invention.

Referring now to FIG. 2, there is shown a flowchart of a system for generating real time flow values, according to an illustrative embodiment of the present invention. The system includes an accurate level generator 300, an accurate flow calculator 400, a real time inflow calculator 500, a predictive abnormal event adjustor 600, and a conditional repeater 700.

The Accurate Level Generator 300 accumulates multiple level values in its memory, then performs an averaging equation which removes abnormal and extreme values to create the most probable level value of the average time of the measurement. This process is repeated twice before transferring the two time-stamped level values to the Accurate Volume Generator 400.

Figure 3:
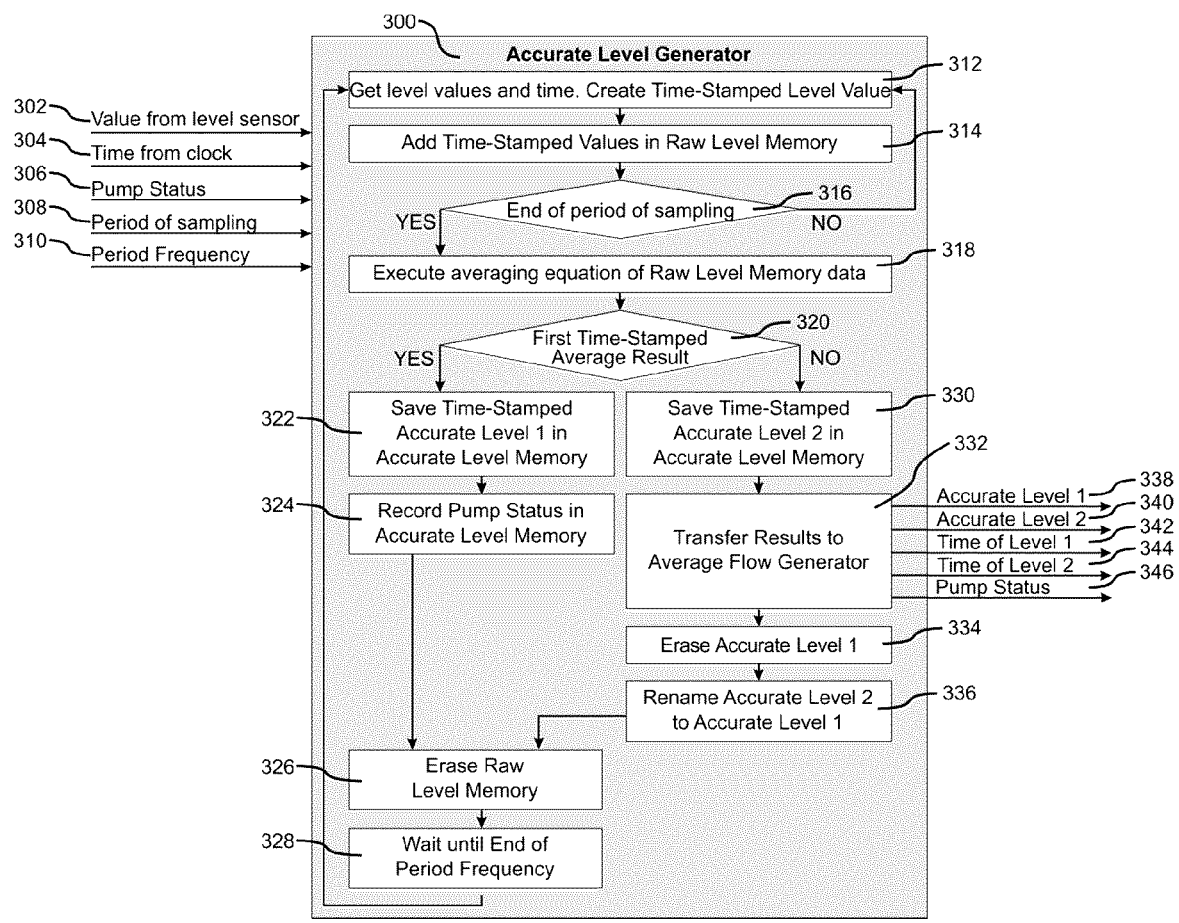
FIG. 3 is a flowchart of an Accurate Level Generator, according to an illustrative embodiment of the present invention.

FIG. 3 illustrates the Accurate Level Generator 300 which gets a value from a level sensor 302, a time value 304 from a clock mechanism, a pump status 306 from the pump-monitoring equipment, a period of sampling 308 and a period frequency 310.

A Time-Stamped value 312 is created from value of level sensor 302 and time value 304. The Time-Stamped values 312 are added to a Raw Level Memory 314 until a switch 316 detects the end of the period of sampling 308. Then, an averaging equation 318 is performed on all the Time-Stamped level values 312 of the Raw Level Memory 314. A switch 320 detects if the resulting level value comes from a first set of data in Accurate Level Memory 322. If it is the first set of data, then the value is named Accurate Level 1 and saved in Accurate Level Memory 322. A recorder 324 also records Pump Status 306 in Accurate Level Memory 322. A function 326 erases Raw Level Memory. A timing function 328 waits for the end of the Period Frequency 310, then restart the entire process. This time, the switch 320 detects data in Accurate Level Memory 322 so a function 330 names the value Accurate Level 2 and saves it in Accurate Level Memory 322. A function 332 transfers the following data to Accurate Flow Generator (shown in FIGS. 2 and 4) Accurate Level 1 (338), Accurate Level 2 (340), Time of Level 1 (342), Time of Level 2 (344) and Pump Status 346.

Then, a function 334 erases Accurate Level 1. Another function 336 renames Accurate Level 2 to Accurate Level 1. Function 326. Function 326 erases Raw Level Memory. A timing function 328 waits for the end of the Period Frequency 310, then restart the entire process.

Figure 4:
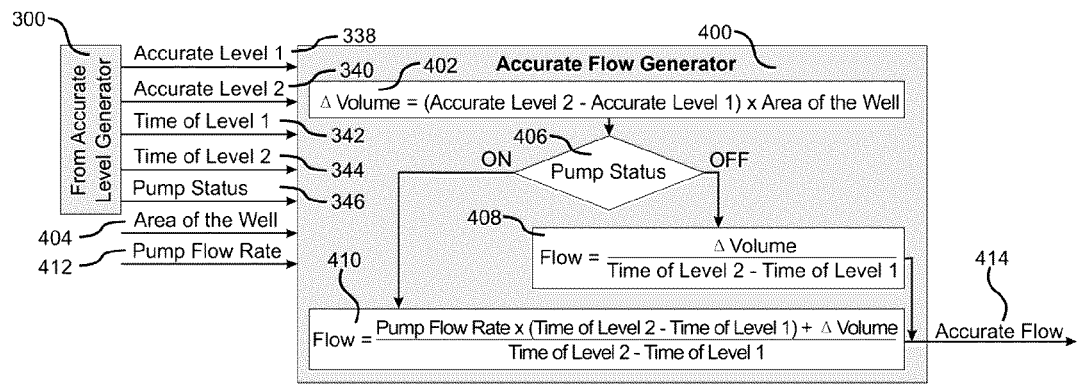
FIG. 4 is a flowchart of an Accurate Flow Calculator mechanism, according to an illustrative embodiment of the present invention.

FIG. 4 illustrates an Accurate Flow Generator 400 which calculates a volume ΔVolume 402 using Accurate Level 1 (338) and Accurate Level 2 (340) generated by Accurate Level Generator 300. There are multiple ways to calculate a volume between two levels. Embodiments of the invention are not limited to any particular volumetric formula. An example of an embodiment is presented in function 402 where the distance between Accurate Level 1 (338) and Accurate Level 2 (340) is multiplied by given Area of the well 404.

Here are some embodiments to calculate the ΔVolume 402. These are examples:
a. Table of formulas that generates the absolute volume for a specific level x. If the geometry of the well changes at different levels, then the table of formulas will have multiple formulas according to the number of different shapes in of the well. If the geometry is the same for the entire well, then the table will only have one formula. Each formula within the table has the following variables: a,b,c,d,min Level.
  i. A,b,c,d is used in the following formula: Volume=a×$x^3$+b×$x^2$+c×x+d
  ii. minLevel is the level at which the volume is calculated.
  iii. In most pump stations, the geometry of the well is constant. In this case, many variables within the formula are not used, therefore the formula becomes this:
  iv. Absolute Volume=Area×Level.
  v. The volume ΔV between the two levels supplied by the Accurate Level Generator is the difference between the two absolute volumes calculated at these levels.
b. A table of volume is created for each possible minimum level variation. Assuming an embodiment in which this minimum level variation is 1 mm, the table would include as many cumulative volume rows as there are possible values of the level.
  i. When a level is selected in the table, the volume at and under that level is returned.
  ii. The volume ΔV between the two levels supplied by the Accurate Level Generator is the difference between the two volumes supplied by the table at these levels.
  iii. A table of volume is created for each possible minimum level variation. Assuming this minimum level variation is 1 mm, the table will include the volume of the millimeter at that level. There are as many volume rows as there are possible values of the level.
  iv. The volume ΔV between the two levels supplied by the Accurate Level Generator is the sum of all the volume values of the table between the two levels supplied.

A pump status switch 406 selects, based on pump status 346 which formula to use to calculate the flow. Formula 408 is used when Pump Status 346 indicates that no pump was in operation and Formula 410 is used when Pump Status 346 indicates that pumps were in operation. Receiving pump flow data or not is the same as a change of pump status.

If no pump was in operation, the following formula 408 is used: The Accurate Flow rate 414 is equal to the calculated ΔVolume 402 divided by the time it took for the surface of the water to go between the two time-stamped levels 344 and 342. It looks like this:

$$\text{Accurate Flow} = \frac{\Delta Volume}{\text{Time of Level 2} - \text{Time of Level 1}}$$

If pumps were in operation, the following formula 410 is used: The Accurate Flow rate 414 is equal to the Pump Flow Rate 412 times the time it took for the surface of the water to go between the two time-stamped levels 344 and 342 plus the calculated ΔVolume 402, then the result is divided by the time it took for the surface of the water to go between the two time-stamped levels 344 and 342.

$$\text{Accurate Flow} = \frac{\begin{array}{c}\text{Pump Flow Rate} \times \\ (\text{Time of Level 2} - \text{Time of Level 1}) + \\ \Delta Volume\end{array}}{\text{Time of Level 2} - \text{Time of Level 1}}$$

Pump Flow Rate 412 represents the pumping rate of the pump(s) in operation. This value can be calculated, measured by an external flow metering source or supplied by the user. The accuracy error of the Pump Flow Rate 412 influences directly the accuracy of the Real Time Flow Meter, so the best Pump Flow Rate meter should be used if possible.

Figure 5:
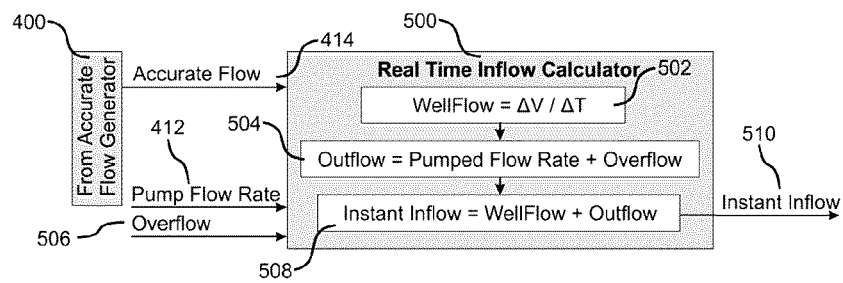
FIG. 5 is a flowchart of a Real Time Inflow Calculator, according to an illustrative embodiment of the present invention.

FIG. 5 illustrates the Real Time Inflow Calculator 500 which takes an Accurate Flow 414 from the Accurate Flow Generator 400 and adds other flows that came out of the pumping well through the pumps or pipes in order to calculate the total flow rate of the liquid that came in during the time period for which the calculation is performed.

WellFlow=ΔV/ΔT. The WellFlow value 502 is usually positive when filling the pump station and negative when pumps are in operation and uncertain during overflow conditions. ΔT is the time it took for the surface of the water to go between the two time-stamped levels 344 and 342 used to calculate the Accurate Flow 414.

Outflow=Pump Flow Rate+Overflow. Outflow 504 represents everything that goes out of the pump station including Pump Flow Rate 412, Overflow 506 and siphon flow (which is the equivalent of a negative Overflow 506). The accuracy error of the Overflow 506 influences directly the accuracy of the Real Time Flow Meter, so the best Overflow meter should be used if possible.

Instant Inflow=WellFlow+Outflow. The Instant Inflow equation 508 is the sum of the positive value WellFlow 502 and usually negative value Outflow 504. The result is the Instant Inflow 510.

In a pump station, when a pump starts, thousands of liters of liquid go from the stop state to the displacement state. The acceleration and deceleration of these thousands of kilograms of liquid does not happen instantaneously. When pumps start or stop, assuming that the pump delivers 100% of its pumping rate or 0% of its normal flow rate instantaneously does not represent the reality since its capacity varies greatly during these events. Several conflicting events occur in the same period.

When a pump starts, the acceleration of the water in the outlet pipe is relative to the level in the well, the pressure at the pump outlet, its power and the design of its turbine. During this period, the level continues to rise, but slowed down gradually to retreat when the pumping capacity exceeds the inflow.

When pumps stop, the deceleration of the water in the outlet pipe 112 (FIG. 1) causes a siphon effect which is related to the outlet pressure, the water hammer mechanism and the general configuration of the outlet piping system. A siphon effect means that water goes through the pumps while they are not in operation. During this period of siphon, the level continues to decrease, but slowed progressively to rise when the flow of the siphon effect becomes lower than the inflow rate.

When a soft start mechanism is used, the speed of the pumps accelerates or decelerates as does the water in the pipe. The increase of rate of the variation of the level is influenced by what is described in the two preceding paragraphs.

Figure 6:
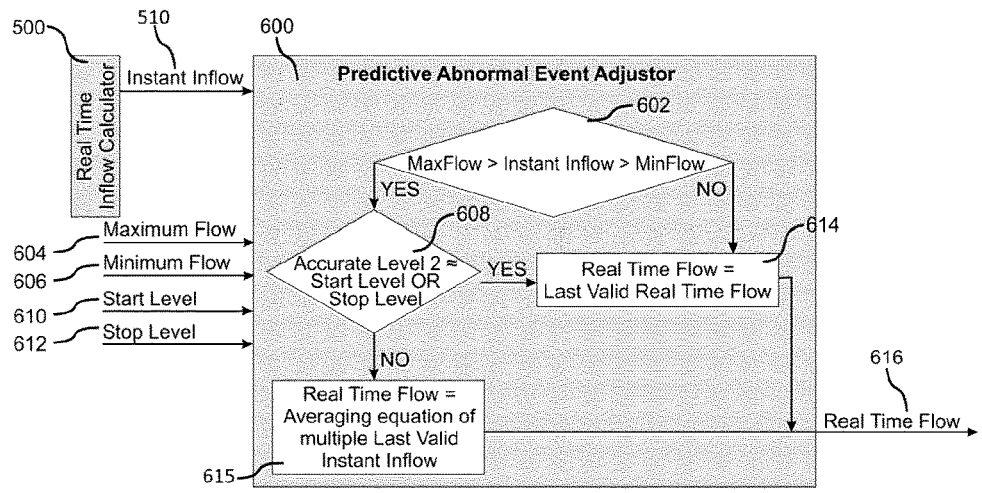
FIG. 6 is a flowchart of a Predictive Abnormal Event Adjuster according to an illustrative embodiment of the present invention.

This transition period of a few seconds is difficult to calculate because of all its variables and can generate false results. FIG. 6 illustrates a Predictive Abnormal Event Adjustor 600 which filters and removes from the Instant Inflow 510 values that are abnormal.

Even with all the mechanisms used to reach the highest possible accuracy, sometimes, the resulting flow calculated is too high or too low and still makes no sense and must be corrected. In the Predictive Abnormal Event Adjuster 600, a switch 602 which compares the Instant Inflow 510 received from the Real Time Inflow Calculator 500 to the maximum value 604 and minimum value 606 in order to select the right operation to perform. If the resulting value is too high or too low, then the Real Time Flow 616 will be equal to the last valid Real Time Flow calculated 614.

If the Instant Inflow 510 received from the Real Time Inflow Calculator 500 is between the maximum value 604 and minimum value 606, then a switch 608 monitors if the Accurate Level 2 is "near (≈)" to a Start Level 610 or Stop Level 612. "Near (≈)" relates to an acceptable variation of the level. Different embodiments of this invention can use but is not limited to a variation given by the user or calculated based on abnormal results during this period or based on pump flow rates from an external flow meter.

If the Accurate Level 2 is near (≈) to a Start Level 610 or Stop Level 612, then the Real Time Flow 616 will be equal to the last valid Real Time Flow calculated 614.

If the Instant Inflow 510 is not too high or too low and not close to a start or stop level, then an averaging equation 615 on multiple Instant Inflow is performed to create the Real Time Flow 616. There are multiple ways to calculate an averaging result. The average algorithm can use a simple average, a normal curve, a regression, descriptive, inferential or inductive analysis, a correlation, a percentile rank or other means to create an average like an average of averages or a mix of averaging formulas.

Figure 7:
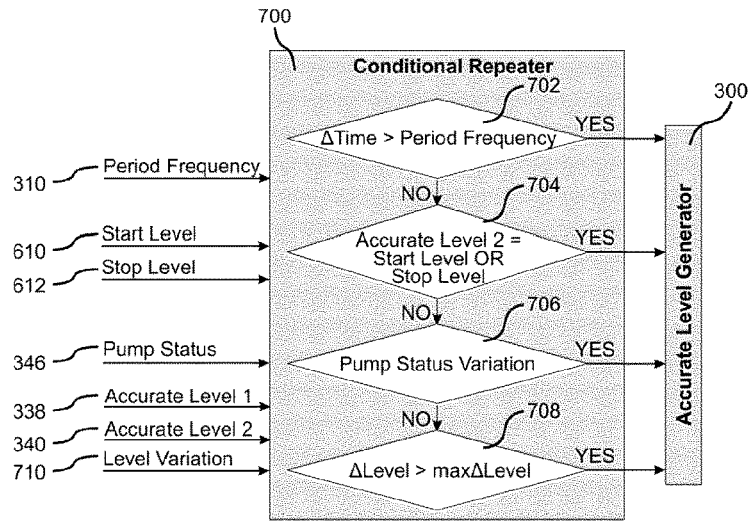
FIG. 7 is a flowchart of a Repeating mechanism according to an illustrative embodiment of the present invention.

FIG. 7 illustrates the Conditional Repeater 700 with the switches which conditioned the repeat of the entire Real Time Flow process.

The first switch 702 detects if the time has reached the end of the Period Frequency. If it reached the end of the Period Frequency, then the entire process restarts with the Accurate Level Generator 300. If it has not, the switch 704 detects if a Start Level 610 or Stop Level 612 was reached. If it reached one of these levels, then the entire process restarts with the Accurate Level Generator 300. If it has not, then the switch 706 detects if there is any variation in the Pump Status 346. If there is a variation in the Pump Status, then the entire process restarts with the Accurate Level Generator 300. If it has not, then the switch 708 detects if the variation between Accurate Level 1 and Accurate Level 2 (ΔLevel) is higher than the maximum Level Variation 710 allowed. If the level variation is higher, then the entire process restarts with the Accurate Level Generator 300.

Figure 8:
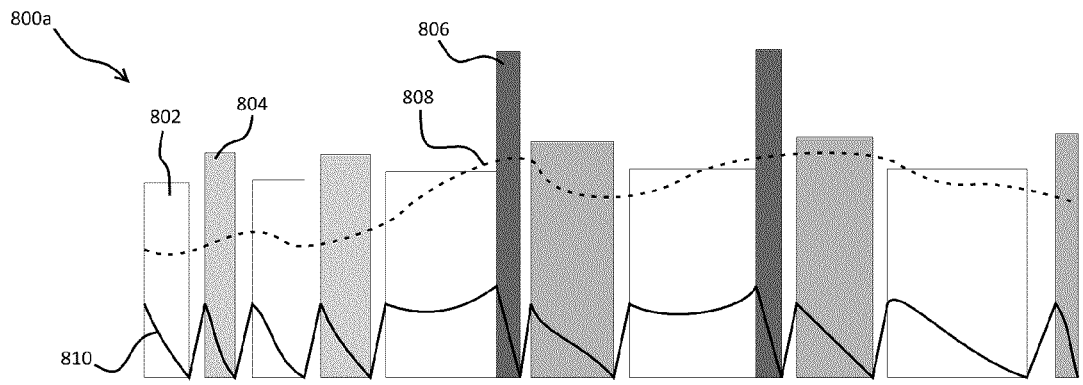
FIG. 8 is a graphical depiction of a known pump operational scheme based on an even number of alternating pump starts.

Another common issue in the field of wastewater pump stations relates to pump management. Wastewater pump stations with constant speed pumps of different maximum flow rates use different schemes to operate the pumps. Referring now to FIG. 8, there is shown in graph form a known common pump operational sequence 800a whereby at least two pumps, illustratively one of a lower flow rate 802 and one of a higher flow rate 804, are evenly and alternatingly used in order wear them out at similar rates. While FIG. 8, along with the Figures to follow, refer to a wastewater pump station with two pumps, a person skilled in the art would understand that pump selection systems often control more than two pumps of varying flow rate capacities.

Still referring to FIG. 8, when required, a dual operation mode 806 is available, whereby both pumps 802 and 804 operate simultaneously. The width of bars 802, 804 and 806 represent the respective run times of each pump, and the height of bars 802, 804 and 806 represent the respective flow rates of each pump. Additionally, the dotted line 808 represents the flow rate of water entering a given wastewater pump station, and the solid line 810 represents the current level of wastewater in the wastewater pump station. Typically, the wastewater level 810 drops when a pump is operating and rises when all the pumps are off. When the flow entering the station 808 is higher than the flow rate of the pump currently in operation 802, 804, an additional pump may start such that the pumps combine for a higher simultaneous flow rate 806, but requiring more energy. Under this operational scheme, the pump with the lower flow rate 802 will require more time to lower the wastewater level 810 than the pump with the higher flow rate 804. As such, even though the pumps 802, 804 may have the same number of starts, their run times vary significantly, and the lower flow rate pump 802 will wear out at a faster rate. Thus, this operational scheme is neither efficient nor economical.

Figure 9:
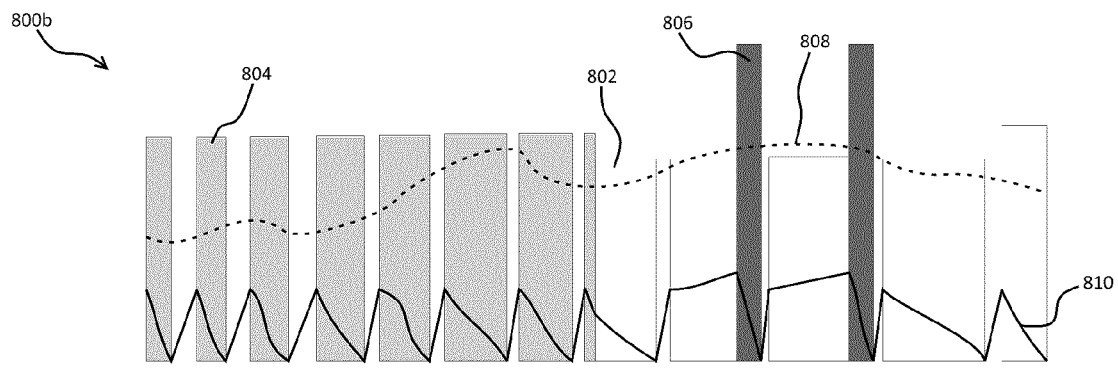
FIG. 9 is a graphical depiction of another known pump operational scheme based on daily or nightly alternating pump starts.

Referring now to FIG. 9, there is shown in graph form a less common known pump operational sequence 800b whereby pumps 802, 804 alternate usage based on the time of day, for example switching at noon or at midnight. In this scheme, the number of starts and the run times of pumps 802, 804 are uneven, as the lower flow rate pump 802 must run for longer periods of time than the higher flow rate pump 804, thereby degrading it at a quicker rate. Additionally, during the operational time of the lower flow rate pump 802, an additional pump will often be required for simultaneous operation 806 due to the lower flow rate pump 802 being unable to handle the flow rate of water 808 entering the wastewater pump station. Thus, as with operating scheme 800a, operational scheme 800b is neither efficient nor economical.

Figure 10:
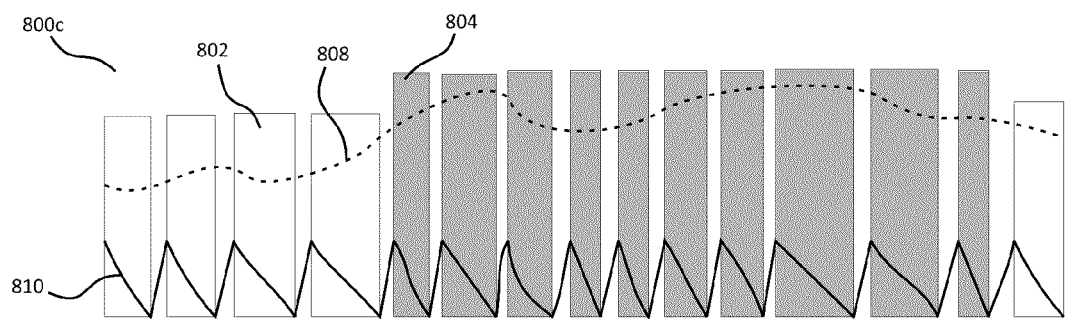
FIG. 10 is a graphical depiction of a pump operational scheme based on pump flow rates, according to an illustrative embodiment of the present invention.

Referring now to FIG. 10, according to the present invention, there is shown in graph form an operational scheme 800c whereby the higher flow rate pump 804 operates when the incoming flow rate 808 is relatively high, and the lower flow rate pump 802 operates when the incoming flow rate 808 is relatively low. According to this scheme, both pumps 802 and 804 receive a similar number of starts and have similar run times. Further, this scheme minimizes the frequency at which multiple pumps are required to operate simultaneously.

Figure 11:
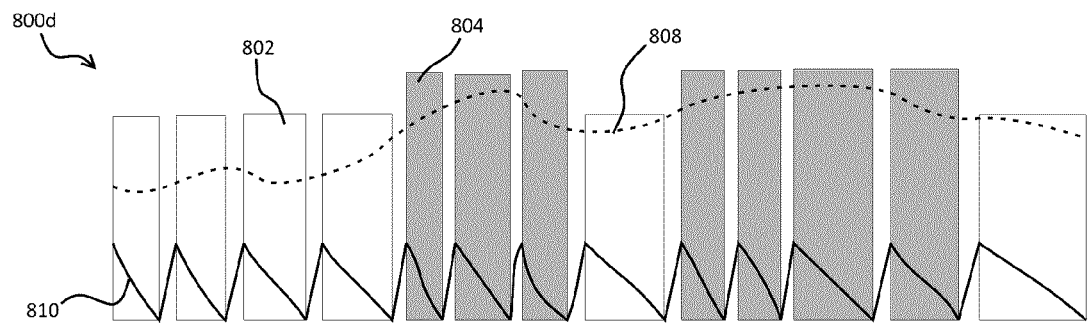
FIG. 11 is a graphical depiction of a pump operational scheme based on pump efficiency, according to an illustrative embodiment of the present invention.
Figure 12:
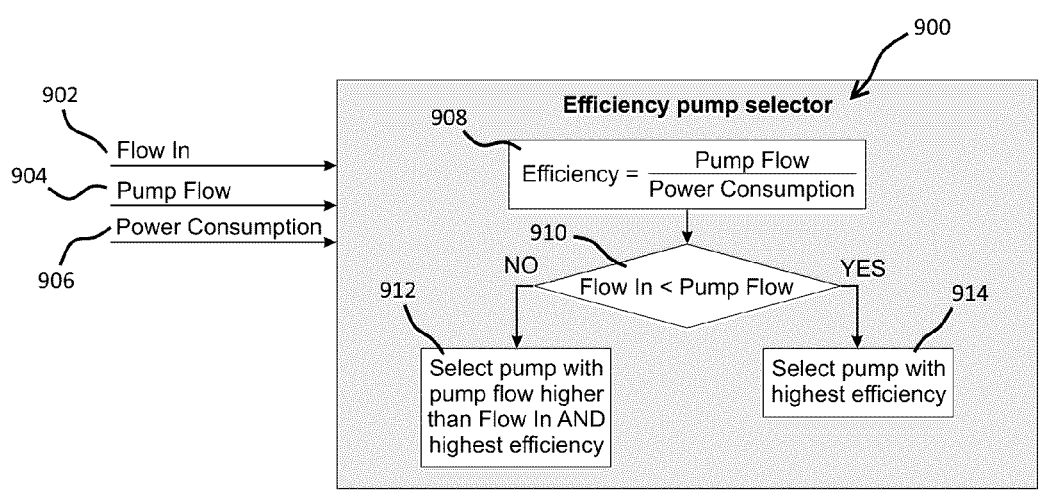
FIG. 12 is a flowchart of a Pump Selecting Mechanism, according to an illustrative embodiment of the present invention.

Referring now to FIG. 11, according to another embodiment of the present invention, there is shown in graph form an operational scheme 800d that uses efficiency as the main deciding operational factor. Efficiency may be calculated as the volume of liquid pumped per watt of electricity used to pump that volume of liquid, or it could be calculated as the number of watts consumed to pump a certain volume of liquid. Referring additionally to FIG. 12, operational scheme 800d may be obtained by an efficiency-based pump selector 900. The pump selector 900 receives flow in data 902 detailing the flow rate of the water entering the wastewater pump station, pump flow data 904 detailing the flow rates of each of a plurality of pumps, and power consumption data 906 for each pump. The pump selector 900 calculates the efficiency 908 for each pump by dividing each pump flow data 904 by corresponding power consumption data 906. Then, switch 910 determines whether the flow rate of the water entering the wastewater pump station is less than the pump flow rate of the pump currently in operation. If the answer is no, then at step 912 the pump selector 900 selects, among the available pumps with flow rates higher than the flow rate of the water 902 entering the wastewater pump station, the pump with the highest efficiency. However, if the answer is yes, then at step 914 the pump selector 900 simply selects the pump with the highest efficiency. In an alternate embodiment, a timer (not shown) may be used such that less efficient pumps may operate from time to time to better distribute pump degradation. In another alternative embodiment, pump selection may be partially based on flow rate such that the most efficient pumps or least efficient pumps only operate for a chosen percentage of the time.

The invention claimed is:

1. A method for determining a real-time instant volumetric inflow (510) into a wastewater pump station, the method comprising the steps of:
   a) receiving a level value from a level sensor (302) at an accurate level generator (300);
   b) receiving a time value (304) from a clock;
   c) receiving a period of sampling (308);
   d) receiving a pump status (306);
   e) receiving a period frequency (310);
   f) associating the level value (302) with the time value (304) to generate a time-stamped level value (312);
   g) storing the time-stamped level value (312) in a raw level memory (314);
   h) when an end of the period of sampling (308) is detected by means of a switch (316), then executing an averaging equation (318) on the time-stamped level values (312) to generate a time-stamped average result;
   when the time-stamped average result is detected by means of a switch (320) as being from a first set of data, then storing the time-stamped average result in an accurate level memory (322) and naming the time-stamped average result as accurate level 1;
   j) storing the pump status (306) in the accurate level memory (322) by means of a recorder (324);
   k) erasing the raw level memory (314) by means of a first function (326);
   l) if there is an end of the period frequency (310) that is detected by means of a timing function (328), then repeating steps a) to k) or else perform the following steps:
   m) if a value that is detected in the accurate level memory (322) by means of the switch (320) is not in the first set of data, then naming the detected value as accurate level 2 by means of a second function (330) and storing the accurate level 2 in the accurate level memory (322);
   n) transmitting the accurate level 1 (338), the accurate level 2 (340), a time of level 1 (342), a time of level 2 (344) and pump status (346) to an accurate flow generator (400);
   o) erasing accurate level 1 by means of a third function (334);
   p) renaming accurate level 2 to accurate level 1 and erasing the raw level memory (314) by means of the first function (326);
   q) receiving the accurate level 1 (338), the accurate level 2 (340), the time of level 1 (342), the time of level 2 (344) and the pump status (346) from the accurate level generator (300), as well as an area of a well (404) and a pump flow rate (412), at the accurate flow generator (400);

r) calculating a difference of volume ΔV (402) by the formula:

$$\Delta V = (\text{Accurate Level 2} - \text{Accurate Level 1}) \times \text{Area of the Well}$$

s) if the pump status (346) is off, then calculating the accurate flow (414) with the formula of accurate flow (408):

$$\text{Accurate Flow} = \frac{\Delta \text{Volume}}{\text{Time of Level 2} - \text{Time of Level 1}}$$

wherein:
the accurate flow (414) if the pump status (346) is off=ΔV/ΔT,
ΔVolume=ΔV=(Accurate Level 2-Accurate Level 1)×Area of the Well,
ΔT=Time of Level 2-Time of Level 1;

t) if the pump status (346) is on, then calculating the accurate flow (414) with the formula (410):

$$\text{Accurate Flow} = \frac{\text{Pump Flow Rate} \times (\text{Time of Level 2} - \text{Time of Level 1}) + \Delta \text{Volume}}{\text{Time of Level 2} - \text{Time of Level 1}}$$

wherein:
the accurate flow (414) if the pump status (346) is on=(Pump Flow Rate×ΔT+ΔV)/ΔT
ΔV=(Accurate Level 2-Accurate Level 1)×Area of the Well,
ΔT=Time of Level 2-Time of Level 1,
Pump Flow Rate is the pumping rate of the pump(s) in operation during ΔT;

u) transmitting the calculated accurate flow (414) to a real-time inflow calculator (500);

v) receiving the calculated accurate flow (414) from the accurate flow generator (400), as well as the pump flow rate (412) and overflow (506), at the real-time inflow calculator (500), said accurate flow (414) being a calculated well flow (502) corresponding to the formula (408) or formula (410);

w) calculating an outflow (504) with formula pump flow rate (412)+overflow (506); and x) calculating the instant inflow (510) with formula (508): well flow (502)+outflow (504), whereby the instant inflow (510) is generated in real time.

2. The method of claim 1, wherein the level sensor sensing the level value (302) is an analog sensor.

3. The method of claim 1, further comprising the steps of:
a1) receiving the instant inflow (510) at a predictive abnormal event adjustor (600);
a2) receiving a maximum flow value (604), a minimum flow value (606), a start level value (610), and a stop level value (612) at the predictive abnormal event adjustor (600);
a3) if the instant inflow (510) is detected by means of switch (602) to be between the maximum flow value (604) and the minimum flow value (606), then detecting if the accurate level 2 (340) is equal to the start level (610) or the stop level (612) by means of a switch (608);
a4) if the accurate level 2 (340) is not nearly equal to the start level (610) or the stop level (612), then calculating a real time flow (616) by means of an averaging equation (615); and
a5) if the instant inflow (510) is detected by means of switch (602) to be above the maximum flow value (604) or below the minimum flow value (606), then determining that the real time flow (616) is equal to a last valid real time flow calculated (614).

4. The method of claim 3, further comprising the steps of:
b1) receiving the period frequency (310), the start level value (610), the stop level value (612), the pump status (346), the accurate level 1 (338), the accurate level 2 (340) and a maximum level variation (710) at a conditional repeater (700);
b2) if the time has reached the end of the period frequency as detected by a first switch (702), then repeat steps a) to q) or else continue with the following steps:
b3) if the time has not reached the end of the period frequency as detected by the first switch (702), then detecting if the start level (610) or the stop level (612) has been reached by means of second switch (704);
b4) if the start level (610) or the stop level (612) has been reached by means of the second switch (704), then repeat steps a) to q) or else continue with the following steps:
b5) if a variation of the pump status (346) is detected by means of a third switch (706), then repeat steps a) to q) or else continue with the following steps:
b6) if a variation of the pump status (346) is not detected by means of the third switch (706), then detecting a variation (ΔLevel) between accurate level 1 (338) and accurate level 2 (340); and
b7) if the variation (ΔLevel) between accurate level 1 (338) and accurate level 2 (340) is higher than the maximum level variation (710), then then repeat steps a) to q) or else end the method.

5. A system for determining a real-time instant inflow (510) into a wastewater pump station, comprising:
an accurate level generator (300) comprising a processor executing instructions that when executed are configured to perform the steps a) to q) defined in claim 1;
an accurate flow generator (400) comprising a processor executing instructions that when executed are configured to perform the steps r) to v) defined in claim 1; and
a real time inflow calculator (500) comprising a processor executing instructions that when executed are configured to perform the steps w) to z) defined in claim 1.

6. The system of claim 5, further comprising:
a predictive abnormal event adjustor (600) comprising a processor executing instructions that when executed are configured to perform the steps of:
a1) receiving the instant inflow (510) at a predictive abnormal event adjustor (600);
a2) receiving a maximum flow value (604), a minimum flow value (606), a start level value (610), and a stop level value (612) at the predictive abnormal event adjustor (600);
a3) if the instant inflow (510) is detected by means of switch (602) to be between the maximum flow value (604) and the minimum flow value (606), then detecting if the accurate level 2 (340) is equal to the start level (610) or the stop level (612) by means of a switch (608);

a4) if the accurate level 2 (340) is not nearly equal to the start level (610) or the stop level (612), the calculating a real time flow (616) by means of an averaging equation (615); and a5) if the instant inflow (510) is detected by means of switch (602) to be above the maximum flow value (604) or below the minimum flow value (606), then determining that the real time flow (616) is equal to a last valid real time flow calculated (614).

7. The system of claim 6, further comprising:

a conditional repeater (700) comprising a processor executing instructions that when executed are configured to perform the steps of:

b1) receiving the period frequency (310), the star level value (610), the stop level value (612), the pump status (346), the accurate level 1 (338), the accurate level 2 (340) and a maximum level variation (710) at a conditional repeater (700);

b2) if the time has reached the end of the period frequency as detected by a first switch (702), then repeat steps a) to q) or else continue with the following steps:

b3) if the time has not reached the end of the period frequency as detected by the first switch (702), then detecting if the start level (610) or the stop level (612) has been reached by means of second switch (704);

b4) if the start level (610) or the stop level (612) has been reached by means of the second switch (704), then repeat steps a) to q) or else continue with the following steps:

b5) if a variation of the pump status (346) is detected by means of a third switch (706), then repeat steps a) to q) or else continue with the following steps:

b6) if a variation of the pump status (346) is not detected by means of the third switch (706), then detecting a variation (ΔLevel) between accurate level 1 (338) and accurate level 2 (340); and b7) if the variation (ΔLevel) between accurate level 1 (338) and accurate level 2 (340) is higher than the maximum level variation (710), then then repeat steps a) to q) or else no other steps are performed.

* * * * *